(12) United States Patent
Nadel

(10) Patent No.: US 6,315,140 B1
(45) Date of Patent: Nov. 13, 2001

(54) BOTTLE/CAP ASSEMBLY WITH SWEEP-AND-DRAIN ACTION

(75) Inventor: Murray Nadel, New Rochelle, NY (US)

(73) Assignee: Nadel Industries, Inc., Port Chester, NY (US)

( * ) Notice: Subject to any disclaimer, the term of this patent is extended or adjusted under 35 U.S.C. 154(b) by 0 days.

(21) Appl. No.: 09/638,929

(22) Filed: Aug. 15, 2000

(51) Int. Cl.[7] .......................... A45D 40/00; A46B 11/00; B65D 53/00; B65D 51/32

(52) U.S. Cl. .......................... 215/354; 215/228; 215/391; 215/329; 401/122; 401/127; 401/129

(58) Field of Search .................... 215/228, 329, 215/320, 354, 390–391; 220/212, 735, 736, 288, 304; 401/121, 122, 127, 129

(56) References Cited

U.S. PATENT DOCUMENTS

| | | |
|---|---|---|
| 4,609,300 * | 9/1986 | Robert . |
| 4,666,323 * | 5/1987 | Kessler . |
| 4,706,829 * | 11/1987 | Li . |
| 5,599,125 * | 2/1997 | Vasas et al. . |
| 5,794,803 * | 8/1998 | Sprick . |
| 5,875,791 * | 3/1999 | Sheffler et al. . |
| 6,045,280 * | 4/2000 | Nadel et al. . |
| 6,223,945 * | 5/2001 | Giblin et al. . |

* cited by examiner

Primary Examiner—Nathan J. Newhouse
(74) Attorney, Agent, or Firm—Amster, Rothstein & Ebenstein

(57) ABSTRACT

A bottle/cap assembly with sweep-and-drain action includes a bottle, a cap and a sweep-and-drain mechanism. The bottle has in series, from the bottom to the top, a closed bottom, a body sidewall, a cylindrical neck sidewall, and an open top. The cap is configured and dimensioned to be rotatably received about the neck sidewall and includes a closed cap top to close the open top and prevent egress of liquid from within the bottle. The sweep-and-drain mechanism includes (i) a circumferentially spaced plurality of vertically extending grooves or slots in the bottle extending downwardly from the open top through said neck sidewall, and (ii) a circumferentially spaced plurality of radially extending vanes or wipers projecting downwardly from the closed cap top towards the open top. When the cap is disposed on the bottle with the vanes or wipers proximate to the open top, rotation of the cap relative to the bottle causes the vanes or wipers to circumferentially sweep and push any liquid accumulated on the open top into a position vertically aligned with the grooves or slots so that such accumulated liquid can drain downwardly through the grooves or slots towards the closed bottom under the influence of gravity.

11 Claims, 6 Drawing Sheets

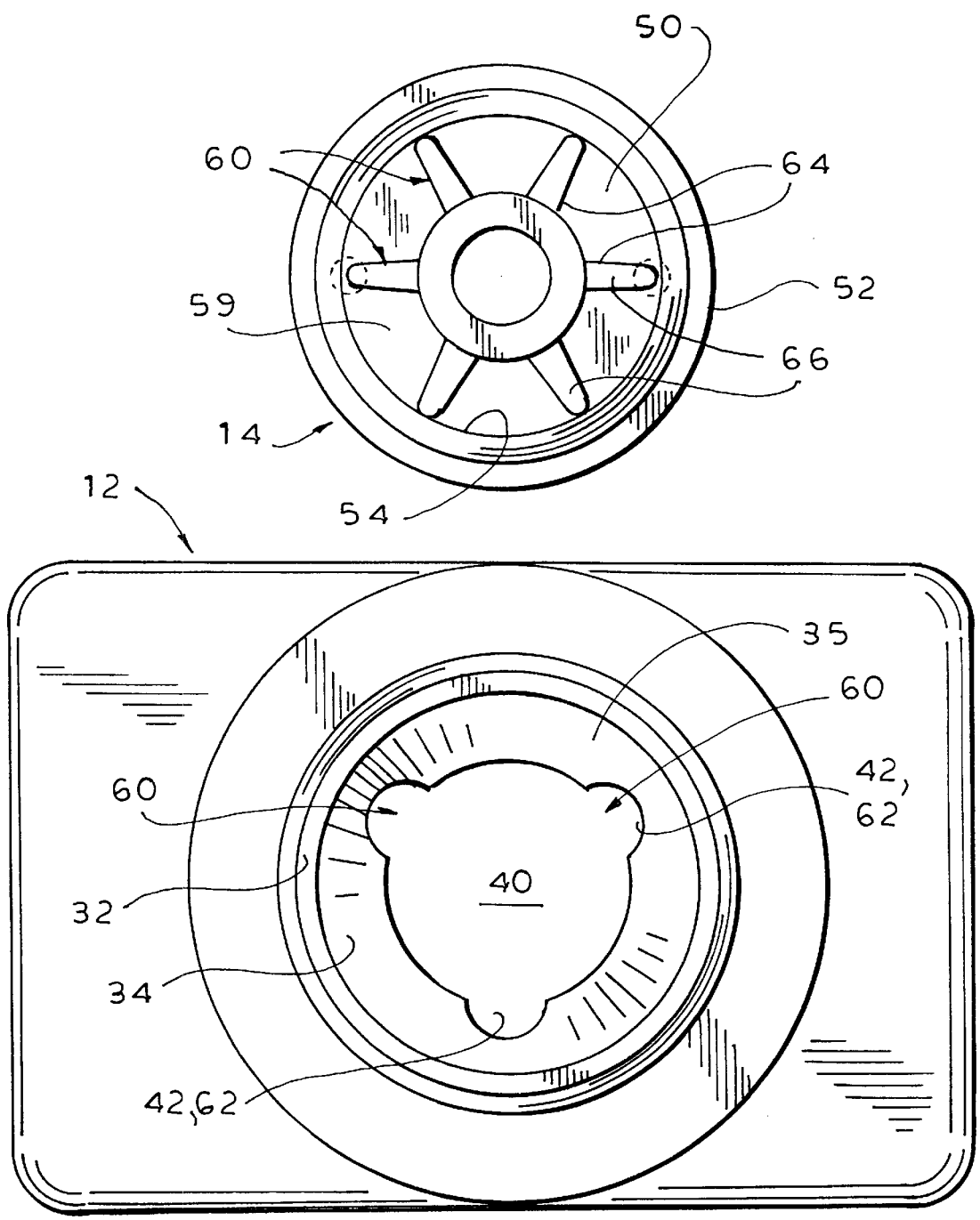

BOTTLE/CAP ASSEMBLY WITH SWEEP-AND-DRAIN ACTION

BACKGROUND OF THE INVENTION

The present invention relates to a bottle/cap assembly wherein the cap is rotatably secured to the top of the bottle in order to close the open bottle top, and more particularly to such an assembly having a unique sweep-and-drain mechanism for removing excess liquid product from the top and returning it to the bottle.

It is well known to provide a bottle/cap assembly wherein the bottle has in series, from the bottom to the top, a closed bottom, a body sidewall, a cylindrical neck sidewall, and an open top. More particularly, the bottle has in series, from the bottom to the top, a bottom portion, a body portion, a neck portion, and a top portion, with the bottom portion defining a closed bottom, the top portion defining an open top, the neck portion defining a cylindrical neck sidewall, and the body portion defining a body sidewall. The cap is configured and dimensioned to be received about the neck sidewall, and includes a closed cap top to close the open top of the bottle and prevent egress of liquid from within the bottle even when the bottle is inverted. The cap may be rotatable about the neck sidewall or not; however, the present invention is limited to those assemblies wherein the cap is rotatably received about the neck sidewall. Such bottle/cap assemblies are well known in the art and used for a wide variety of applications.

Preferably, the top portion is of substantial diameter relative to the body portion of the bottle for a variety of functional reasons. This design enables the body to have greater strength, facilitates application and rotation of the cap on the bottle, facilitates bottle manufacture, etc. On the other hand, in order to limit to some degree the amount of fluid which flows through the open top when the bottle is at least partially inverted without the cap thereon, the liquid discharge channel is preferably substantially smaller than the outer diameter of the neck portion. As a result, the top portion defines an upper surface extending from the inside of the cylindrical neck wall to the liquid discharge channel, defining an annulus of substantial area.

Where the liquid to be dispensed from the bottle is of relatively modest value, it is of only minor concern whether or not the liquid passing through the liquid discharge channel collects on the upper surface of the top portion. Under particular circumstances, this accumulation may be aesthetically undesirable--for example, where the liquid is oily, sticky, or the like. In some cases the presence of liquid on the upper surface of the top portion may lead to problems in reopening the assembly (that is, removing the top from the bottle) after the liquid has dried, due to its adhesive quality. In any case, such an accumulation is aesthetically undesirable.

Where the liquid to be dispensed from the bottle is of relatively high value (such as perfume, nail polish, essential oils, or the like), the accumulated liquid left on the upper surface of the top portion represents an economic loss to the consumer, who in all likelihood will utilize in the future only fresh liquid coming out of the liquid channel.

Thus, whether it be for economic, functional, or aesthetic reasons, it is known to provide the top portion with a plurality of circumferentially spaced passageways extending from the upper surface of the top portion, through the neck portion, and discharging into the body portion, thereby to promote the drainage of liquid from the upper surface back into the bottle. While the provision of such a series of drain channels extending through the neck portion represents an advance, they have not proven to be entirely satisfactory in use. In order not to overly weaken the neck portion, the drain channels cannot be closely spaced together, and in fact tend to be rather widely spaced apart along one or more circumferences between the inner and outer surfaces of the neck portion. As a result, while the liquid accumulated directly over the one of the drain channels may be drained away back into the bottle, a significant portion of the liquid accumulation remains on the upper surface of the top portion and is not subjected to the draining action of the drain channels.

Accordingly, it is an object of the present invention to provide a bottle/cap assembly with a sweep-and-drain action.

Another object is to provide such an assembly wherein rotation of the cap relative to the bottle circumferentially sweeps and pushes any liquid accumulated on the upper surface of the bottle into a position facilitating liquid drainage.

A further object is to provide such an assembly which is simple and inexpensive to manufacture, use, and maintain.

SUMMARY OF THE INVENTION

It has now been found that the above and related objects of the present invention are obtained in a bottle/cap assembly with sweep-and-drain action comprising a bottle, a cap and a sweep-and-drain mechanism. The bottle has in series, from the bottom to the top, a closed bottom, a body sidewall, a cylindrical neck sidewall, and an open top. The cap is configured and dimensioned to be rotatably received about the sidewall and includes a closed cap top to close the open top and prevent egress of liquid from within the bottle. The sweep-and-drain mechanism includes (i) a circumferentially spaced plurality of vertically extending grooves or slots in the bottle extending downwardly from the open top through the neck sidewall, and (ii) a circumferentially spaced plurality of radially extending vanes or wipers projecting downwardly from the closed cap top towards the open top. When the cap is disposed on the bottle with the vanes or wipers proximate to the open top, rotation of the cap relative to the bottle causes the vanes or wipers to circumferentially sweep and push any liquid accumulated on the top into a position vertically aligned with the grooves or slots so that such accumulated liquid can drain downwardly through the grooves or slots towards the closed bottom under the influence of gravity.

In a preferred embodiment the bottle has in series, from the bottom to the top, a bottom portion, a body portion, a neck portion, and a top portion, the bottom portion defining a closed bottom, the top portion defining an open top, the neck portion defining a cylindrical neck sidewall, and the body portion defining a body sidewall. The cap is configured and dimensioned to be rotatably received about the neck sidewall and includes a closed cap top to close the open top and prevent egress of the liquid from within the bottle. The sweep-and-drain mechanism includes (i) a circumferentially spaced plurality of vertically extending grooves or slots in the bottle extending downwardly from the top portion through the neck portion, and (ii) a circumferentially spaced plurality of radially extending vanes or wipers projecting downwardly from the closed cap top. The cap is disposed on the bottle with the vanes or wipers proximate to the top portion.

Preferably the open top slopes downwardly and inwardly, and the vanes or wipers slope downwardly and inwardly. The open top defines an upper surface and the vanes or wipers define a lower surface. The lower surface of the vanes or wipers is closely proximate to the upper surface of the open top, thereby to effect a sweeping action on the upper surface during relative rotation of the cap and the bottle.

Preferably, the bottle is a plastic construction including a clear lower portion to reveal the color of the liquid and an opaque upper portion to conceal the drain mechanism, the lower and upper portions being sealed together in airtight relationship, e.g., ultrasonically sealed together.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein:

FIG. 5 is a bottom plan view of the cap taken along the line 5—5 of FIG. 2;

FIG. 6 is a top plan view of the bottle taken along the line 6—6 of FIG. 2; and

DETAILED DESCRIPTION OF THE PREFERRED EMBODIMENTS

Figure 1:
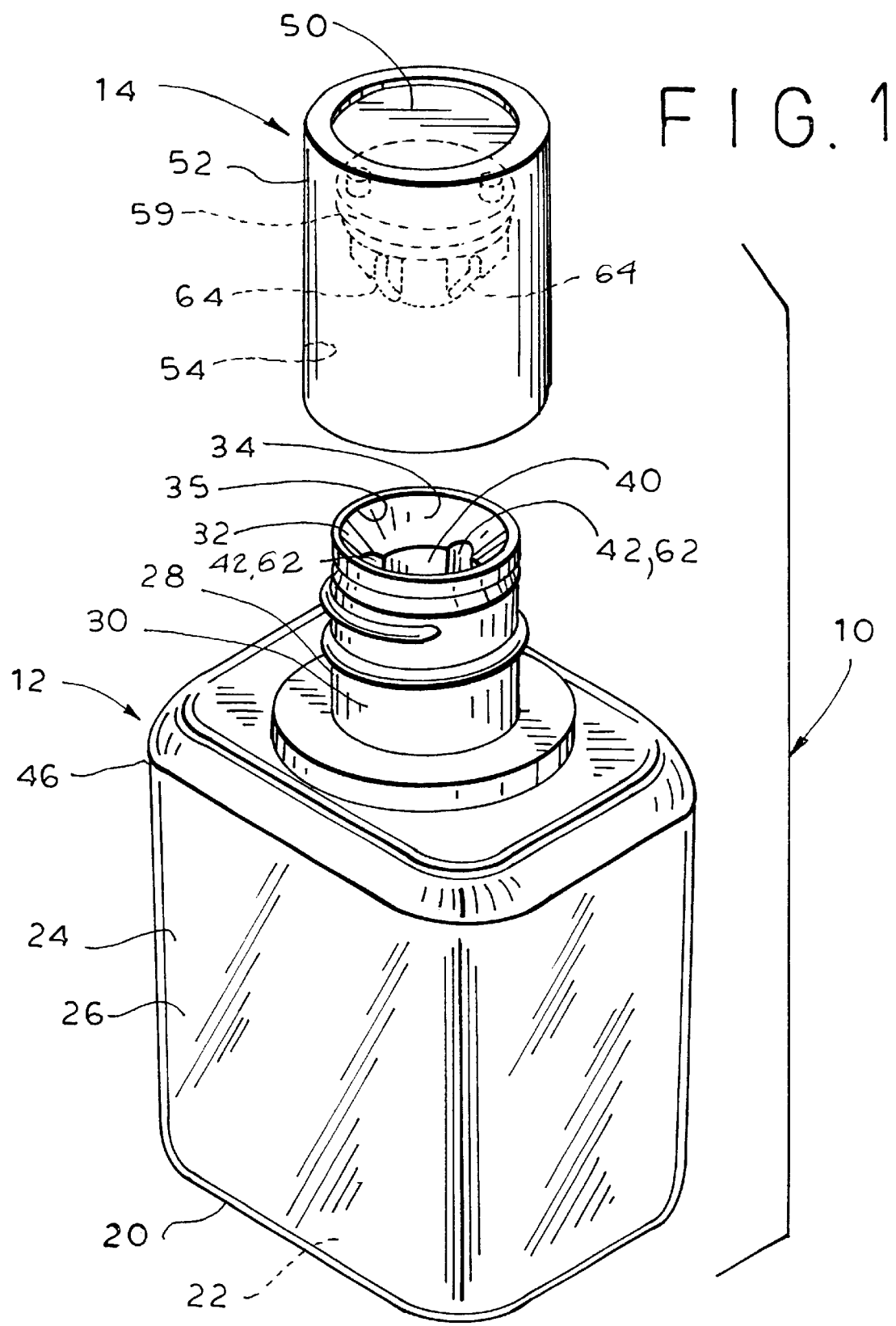
FIG. 1 is an exploded isometric view of a bottle/cap assembly according to the present invention.
Figure 2:
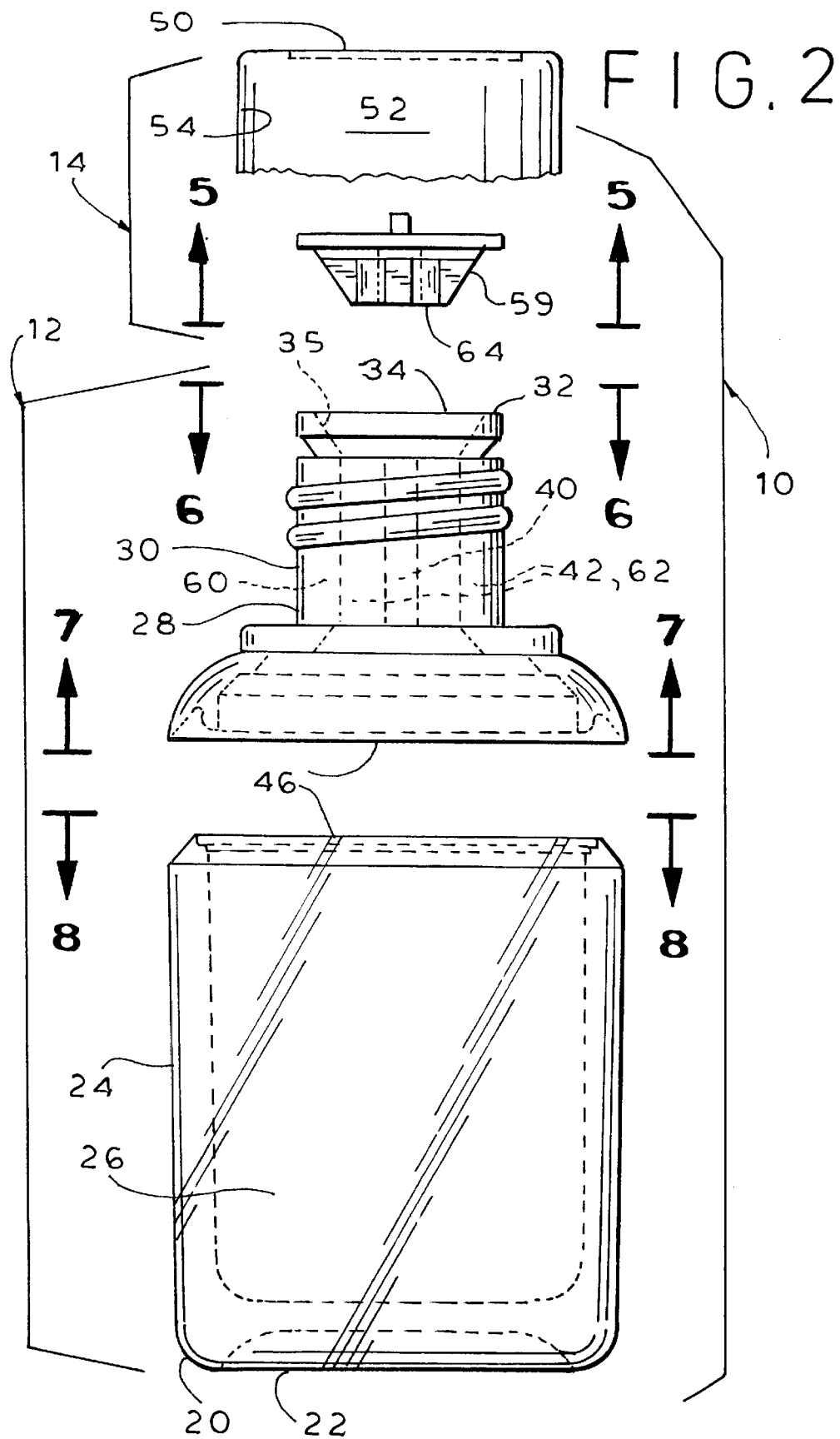
FIG. 2 is a fragmentary exploded front elevational view of the assembly.
Figure 3:
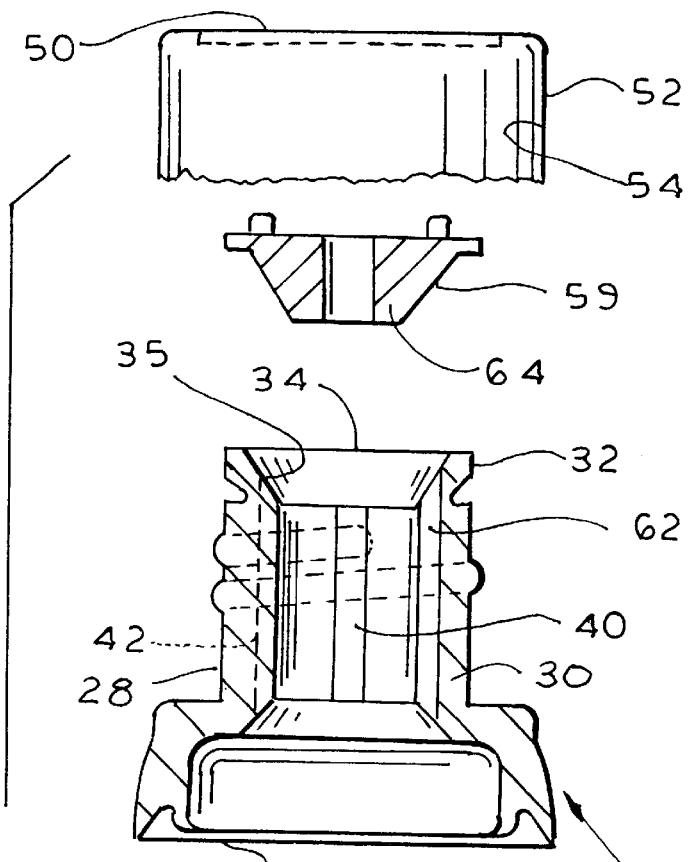
FIG. 3 is a fragmentary exploded front elevational view, in cross section, of the assembly.

Referring now to the drawing, and in particular to FIGS. 1–3 thereof, therein illustrated is a bottle/cap assembly according to the present invention, generally designated by the reference numeral 10. In its conventional aspects, the assembly 10 comprises a bottle, generally designated 12, and a cap, generally designated 14.

Referring now also to FIGS. 4 and 6–8, the bottle 12 has in series, from the bottom to the top, a bottom portion 20 defining a closed bottom 22, a body portion 24 defining a body sidewall 26, a neck portion 28 defining a cylindrical neck sidewall 30, and a top portion 32 defining an open top 34. In essence then, the bottle 12 has in series, from the bottom to the top, a closed bottom 22, a body sidewall 26, a cylindrical neck sidewall 30, and an open top 34. In combination, these elements 22, 26, 30, 34 define a liquid-tight compartment having a centrally disposed liquid discharge passage 40 extending through the neck portion 28 and out of the top portion 32. The top portion 32 (about the open top 34) and/or the neck portion 28 (about the liquid discharge passage 40) defines an upper surface 35 of the bottle 12 where liquid tends to accumulate. Typically, but not necessarily, the body sidewall 26 has a width dimension greater than the corresponding dimension of the neck sidewall 30.

With the exception of the liquid discharge passage 40 and the liquid drain channels 42 to be described hereinafter, the bottom portion 20, body portion 24, neck portion 28, and top portion 32 define a liquid-tight container which, in the upright orientation, prevents the egress of liquid from the bottle 12. The various portions may be formed of glass, plastic, or other materials which will neither adversely affect nor be adversely affected by the liquid contained within the bottle. For example, as illustrated, the bottle 12 is preferably a two-piece plastic obstruction including a clear lower portion 20, 24 to reveal the color of the liquid within the bottle and an opaque upper portion 28, 34 to conceal the drain mechanism. The lower and upper portions are sealed together at 46 in a liquid-tight relationship—e.g., being ultrasonically sealed together. Indeed, the bottle 12 may be a hybrid composed in part of glass and in part of plastic. For example, the neck portion 28 may be comprised of a threaded or unthreaded outer cylindrical portion of glass and an inner plastic annulus which is snugly (and optionally releasably) received within the outer neck portion of glass and has an inner surface defining the liquid discharge passage 40 and a top surface defining the upper surface 35 upon which liquid tends to accumulate.

Figure 4:
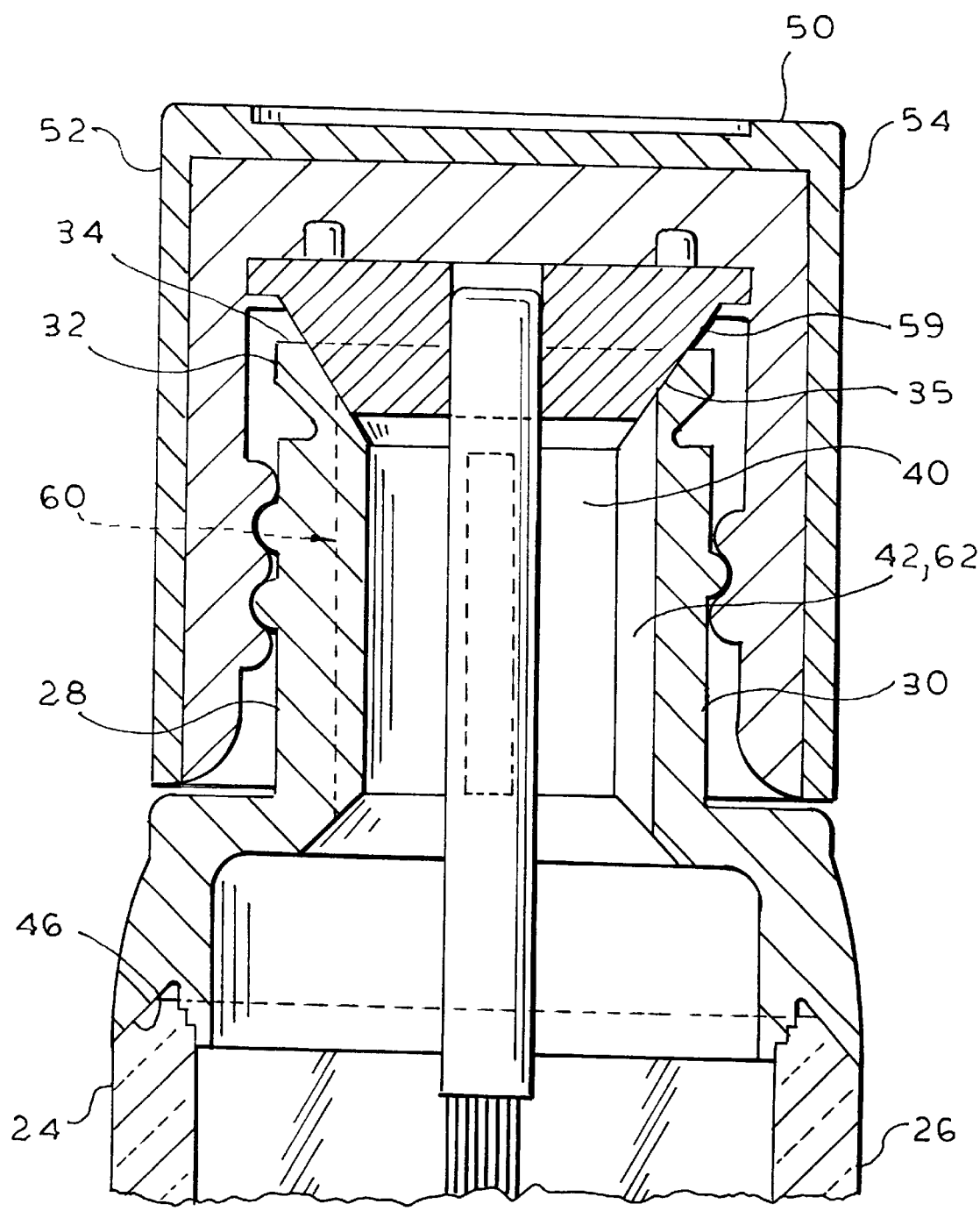
FIG. 4 is a fragmentary front elevational view, in cross section, of the assembly.
Figure 7:
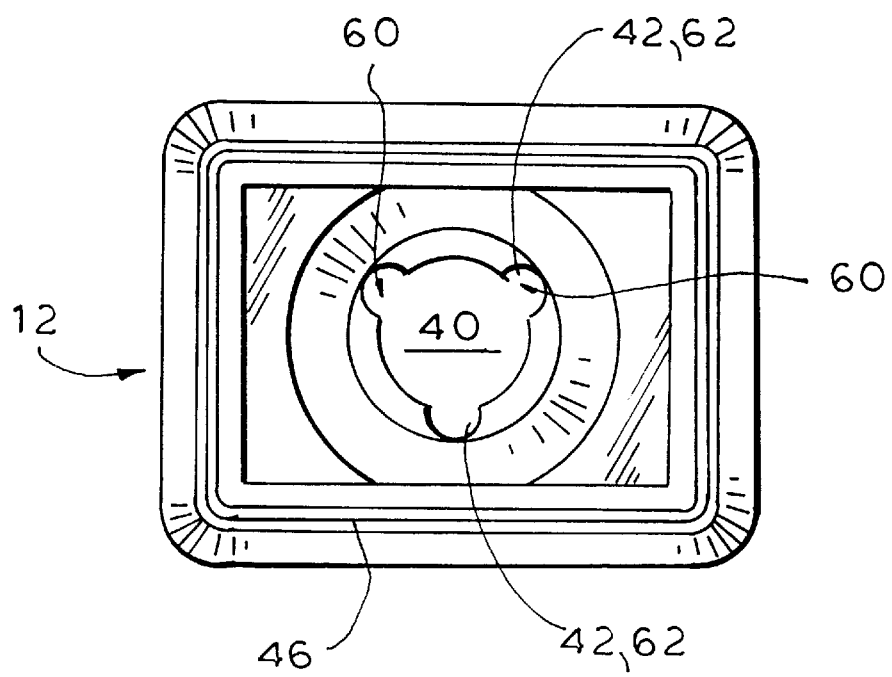
FIGS. 7 and 8 are plan views of the bottle, in section, taken along the lines 7—7 and 8—8, respectively, of FIG. 2.
Figure 8:
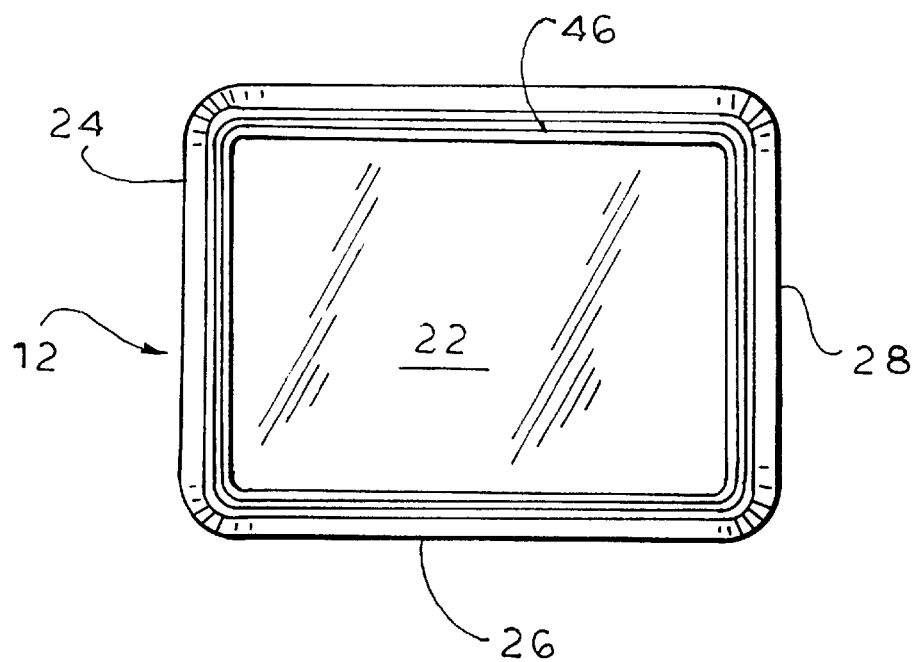

Referring now to FIGS. 4 and 5, the cap 14 is configured and dimensioned to be rotatably received around the cylindrical neck sidewall 30. Relative rotatability of the cap 14 and bottle 12 is a critical feature of the present invention. The cap 14 includes a closed cap top 50 which closes the open top 34 of the bottle (and in particular the liquid discharge passage 40) and thereby prevents egress of liquid from within the bottle 12, regardless of the orientation of the bottle. The cap 14 further includes a cylindrical cap sidewall 52 depending from the closed cap top 50 and adapted to rotatably receive therein the neck sidewall 30.

Referring now to FIG. 4 in particular, depending upon the particular application of the assembly, the cap inner sidewall 54 and the neck outer sidewall 30 may be threaded for mutual engagement or smooth. A threaded engagement between the two threaded surfaces 30, 54 is particularly useful where the liquid contained within the bottle is not particularly viscous (for example, cheek blush), and a good seal is imperative. Alternatively, the two surfaces 30, 54 may simply be smooth and snugly fitting together where the liquid within the bottle is relatively viscous (for example, eyeliner or mascara) and there is not anticipated to be a major force tending to separate the cap and the bottle except when the user intentionally separates them. It is, however, critical to operation of the present invention that the cap be rotatable relative to the bottle, for reasons which will become apparent hereinafter.

As illustrated only in FIG. 4, a mascara, nail polish or like applicator 70 may have an upper end secured centrally within cap 14 and extend downwardly through the liquid discharge passage 40 of bottle 12 to facilitate the withdrawal and application of liquid from the bottle 12 by the user.

In its novel aspects, the bottle/cap assembly 10 of the present invention additionally includes a sweep-and-drain mechanism, generally designated 60. The sweep-and-drain mechanism 60 is comprised partially by the bottle 12 and partially by the cap 14. One aspect of the mechanism 60 comprises a circumferentially spaced plurality of vertically extending grooves or slots 62 in the bottle 12 extending downwardly from the upper surface 35 through the neck portion 28. The vertically extending grooves or slots 62 act as liquid drain channels 42 and allow accumulated liquid on the upper surface 35 to pass downwardly through the neck portion 28, under the influence of gravity, into the body portion 24 and reunite with any liquid present therein. Another aspect of the mechanism 60 comprises a circumferentially spaced plurality of radially extending vanes or wipers 64 in the cap 14 projecting downwardly from the closed cap top 50 toward the upper surface 35 of the bottle 12. As illustrated, the component 59 containing vanes or wipers 64 is formed separately from the remainder of the cap 14 but secured thereto (e.g., adhesively) in the final product.

In use, the cap 14 is disposed or placed on top of the bottle 12, with the vanes or wipers 64 proximate to the upper surface 35 of the bottle 12. Then, manual rotation of the cap 14 relative to the bottle 12 causes the vanes or wipers 64 to circumferentially sweep and push any liquid accumulated on the upper surface 35 into a position vertically aligned with the grooves or slots 62 of the neck portion 28 of the bottle 12. This permits the accumulated liquid to drain downwardly from upper surface 35 through the grooves or slots 62 (defining liquid drain channels 42) towards the closed bottom 22 under the influence of gravity.

When the cap is 14 is being placed in threaded engagement with the bottle 12, initially the vanes or wipers 64 of the cap 14 are somewhat spaced above the upper surface 35 of the bottle 12. However, as relative rotation proceeds, as a result of the telescopic action of the cap and the bottle, the vanes or wipers 64 approach the upper surface 35. To this end, the downward extent of the several vanes or wipers 64 may differ so that each of the vanes or wipers 64 is closely proximate to or in contact with the upper surface 35 when the cap is in its final position. Reversely, when the cap 14 is being removed from the top of the bottle 12, the vanes or wipers 64 will initially be proximate to or in contact with the upper surface 35 of the bottle 12, but, as relative rotation continues, as a result of the untelescoping action of the cap and the bottle, the vanes or wipers 64 become further distant from the upper surface 35 of bottle 12.

On the other hand, when the cap 14 is only snugly engaged on the bottle 12, without any threaded engagement, the vanes or wipers 64 are in close proximity to or in contact with the upper surface 35 of the bottle 12 when the cap 14 is in position on the bottle 12, so that relative rotation of the cap and bottle produces the desired sweeping action so long as relative rotation is maintained.

Depending upon the criticality of maintaining the upper surface 35 clean and free of liquid, the viscosity and stickiness of the liquid, and the like, there may be a single ring of drain channels 42 or a plurality of radially spaced concentric rings thereof. Optimal sizing of the grooves or slots 62 in the bottle 12 is easily determined without undue experimentation for particular liquids L taking into account their viscosity, stickiness and the like. Where there are concentrically formed rings of the grooves or slots 62, the grooves or slots 62 of the various rings are preferably, but not necessarily, radially aligned.

The number of vanes or wipers 64 on the cap 14 is preferably equal to the number of grooves or slots 62 in a single ring. The vanes or slots 64 preferably extend from the cap sidewall 52 either to the center of the cap 14 or the liquid discharge passage 40 of the bottle 12 (when the cap is in position on the bottle). Thus, the vanes or wipers 64 preferably extend past each of the rings of the grooves or slots 62.

In a preferred embodiment, the open top 34 (more precisely, the upper surface 35) slopes downwardly and inwardly, as do the vanes or wipers 64. In any case, however, the bottle 12 defines an upper surface 35 and the vanes or wipers 64 define a lower surface 66, with the lower surface 66 being closely proximate to the upper surface 35 so as to produce a sweeping action by the vanes or wipers on the upper surface during relative rotation of the cap 14 and bottle 12. The sweeping action tends to align any accumulated liquid on the upper surface 35 into vertical alignment with the grooves or slots 62 so that such accumulated liquid can drain back into the bottle.

It will be appreciated that if the bottle is to be shaken or inverted prior to use (perhaps to mix the ingredients of the liquid within the sealed bottle), some of the liquid within the bottle may pass upwardly through either the liquid discharge passage 40 or the liquid drain channels 42 (i.e., the grooves or slots 62). However, the subsequent act of removing the cap from the bottle (either by an unthreading or a simple rotation and separation action) will cause the vanes or wipers 64 to provide the desired sweeping action while the grooves or slots 62 enable the desired drain action.

To summarize, the present invention provides a bottle/cap assembly with a sweep-and-drain action whereby rotation of the cap relative to the bottle circumferentially sweeps and pushes any liquid accumulated on the upper surface of the bottle into a position vertically aligned with grooves or slots in the neck portion to facilitate liquid drainage. The assembly is simple and inexpensive to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing disclosure.

I claim:

1. A bottle/cap assembly with sweep-and-drain action, said assembly comprising:
   (A) a bottle having in series, from the bottom to the top, a closed bottom, a body sidewall, a cylindrical neck sidewall, and an open top;
   (B) a cap configured and dimensioned to be rotatably received about said neck sidewall and including a closed cap top to close said open top and prevent egress of liquid from within said bottle; and
   (C) a sweep-and-drain mechanism including:
      (i) a circumferentially spaced plurality of vertically extending grooves or slots in said bottle extending downwardly from said open top through said neck sidewall, and
      (ii) a circumferentially spaced plurality of radially extending vanes or wipers projecting downwardly from said closed cap top towards said open top;
      whereby, when said cap is disposed on said bottle with said vanes or wipers proximate to said open top, rotation of said cap relative to said bottle causes said vanes or wipers to circumferentially sweep and push any liquid accumulated on said open top into a position vertically aligned with said grooves or slots so that such accumulated liquid can drain downwardly through said grooves or slots towards said closed bottom under the influence of gravity.

2. A bottle/cap assembly with sweep-and-drain action, said assembly comprising:
   (A) a bottle having in series, from the bottom to the top, a bottom portion, a body portion, a neck portion and a top portion; said bottom portion defining a closed bottom, said top portion defining an open top, said neck portion defining a cylindrical neck sidewall, and said body portion defines a body sidewall;
   (B) a cap configured and dimensioned to be rotatably received about said neck sidewall and including a closed cap top to close said open top and prevent egress of liquid from within said bottle; and
   (C) a sweep-and-drain mechanism including:
      (i) a circumferentially spaced plurality of vertically extending grooves or slots in said bottle extending downwardly from said top portion through said neck portion, and (ii) a circumferentially spaced plurality of radially extending vanes or wipers projecting downwardly from said closed cap top;

whereby, when said cap is disposed on said bottle with said vanes or wipers proximate to said top portion, rotation of said cap relative to said bottle causes said vanes or wipers to circumferentially sweep and push any liquid accumulated on said open top into a position vertically aligned with said grooves or slots so that such accumulated liquid can drain downwardly through said grooves or slots into said body portion under the influence of gravity.

3. The assembly of claim 2 wherein said bottle is a two-piece plastic construction including a clear lower portion to reveal the color of the liquid and an opaque upper portion to conceal the drain mechanism, said lower and upper portions being sealed together in airtight relationship.

4. The assembly of claim 3 wherein said lower and upper portions are ultrasonically sealed together.

5. The assembly of claim 2 wherein said body portion defines a body sidewall having a width dimension greater than the corresponding dimension of said neck sidewall.

6. The assembly of claim 2 wherein said open top slopes downwardly and inwardly.

7. The assembly of claim 6 wherein said vanes or wipers slope downwardly and inwardly.

8. The assembly of claim 2 wherein said vanes or wipers slope downwardly and inwardly.

9. The assembly of claim 2 wherein said open top defines an upper surface and said vanes or wipers define a lower surface, said lower surface of said vanes or wipers being closely proximate to said upper surface of said open top, thereby to effect a sweeping action on said upper surface during relative rotation of said cap and said bottle.

10. A bottle/cap assembly with sweep-and-drain action, said assembly comprising:

(A) a bottle having in series, from the bottom to the top, a bottom portion, a body portion, a neck portion and a top portion; said bottom portion defining a closed bottom, said top portion defining an open top, said neck portion defining a cylindrical neck sidewall, and said body portion defines a body sidewall;

(B) a cap configured and dimensioned to be rotatably received about said neck sidewall and including a closed cap top to close said open top and prevent egress of liquid from within said bottle; and (C) a sweep-and-drain mechanism including:

(i) a circumferentially spaced plurality of vertically extending grooves or slots in said bottle extending downwardly from said top portion through said neck portion, and (ii) a circumferentially spaced plurality of radially extending vanes or wipers projecting downwardly from said closed cap top;

said open top defining an upper surface which slopes downwardly and inwardly, said vanes or wipers defining a lower surface which slopes downwardly and inwardly, said lower surface of said vanes or wipers being closely proximate to said upper surface of said open top, thereby to effect a sweeping action on said upper surface during relative rotation of said cap and said bottle;

whereby, when said cap is disposed on said bottle with said vanes or wipers proximate to said top portion, rotation of said cap relative to said bottle causes said vanes or wipers to circumferentially sweep and push any liquid accumulated on said open top into a position vertically aligned with said grooves or slots so that such accumulated liquid can drain downwardly through said grooves or slots into said body portion under the influence of gravity.

11. The assembly of claim 10 wherein said bottle is a two-piece plastic construction including a clear lower portion to reveal the color of the liquid and an opaque upper portion to conceal the drain mechanism, said lower and upper portions being ultrasonically sealed together in airtight relationship.

* * * * *